United States Patent
Sughrue et al.

(10) Patent No.: US 6,254,766 B1
(45) Date of Patent: Jul. 3, 2001

(54) DESULFURIZATION AND NOVEL SORBENTS FOR SAME

(75) Inventors: Edward L. Sughrue; Gyanesh P. Khare; Brent J. Bertus; Marvin M. Johnson, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/382,935

(22) Filed: Aug. 25, 1999

(Under 37 CFR 1.47)

(51) Int. Cl.[7] ............................. C10G 29/04; B01J 20/00; B01J 20/30
(52) U.S. Cl. .................. 208/244; 208/208 R; 208/247; 208/299; 208/307; 502/406; 502/407; 502/415
(58) Field of Search ............................. 208/208 R, 244, 208/247, 299, 307; 502/406, 407, 415

(56) References Cited

U.S. PATENT DOCUMENTS

| | | | | |
|---|---|---|---|---|
| 2,951,034 | * | 8/1960 | Stuart ..................................... | 208/244 |
| 4,336,130 | * | 6/1982 | Miller et al. .......................... | 208/243 |
| 5,439,867 | * | 8/1995 | Khare et al. .......................... | 502/407 |
| 5,470,456 | * | 11/1995 | Debras et al. ........................ | 208/244 |
| 5,674,379 | * | 10/1997 | Debras et al. ........................ | 208/244 |
| 5,843,300 | * | 12/1998 | Zinnen et al. ........................ | 208/250 |
| 5,914,292 | * | 6/1999 | Khare et al. .......................... | 502/406 |
| 6,129,835 | * | 10/2000 | Lesieur et al. .................... | 208/208 R |

FOREIGN PATENT DOCUMENTS 0 401 789 * 12/1990 (EP) .

* cited by examiner

*Primary Examiner*—Walter D. Griffin
(74) *Attorney, Agent, or Firm*—Jack E. Phillips

(57) ABSTRACT

Particulate sorbent compositions comprising a mixture of zinc oxide, silica, alumina and a substantially reduced valence nickel are provided for the desulfurization of a feedstream of cracked-gasoline or diesel fuels in a desulfurization zone by a process which comprises the contacting of such feedstreams in a desulfurization zone followed by separation of the resulting low sulfur-containing stream and sulfurized-sorbent and thereafter regenerating and activating the separated sorbent before recycle of same to the desulfurization zone.

25 Claims, No Drawings

DESULFURIZATION AND NOVEL SORBENTS FOR SAME

FIELD OF THE INVENTION

This invention relates to the removal of sulfur from fluid streams of cracked-gasolines and diesel fuels. In another aspect this invention relates to sorbent compositions suitable for use in the desulfurization of fluid streams of cracked-gasolines and diesel fuel. A further aspect of this invention relates to a process for the production of sulfur sorbents for use in the removal of sulfur bodies from fluid streams of cracked gasolines and diesel fuels.

BACKGROUND OF THE INVENTION

The need for cleaner burning fuels has resulted in a continuing world wide effort to reduce sulfur levels in gasoline and diesel fuels. The reducing of gasoline and diesel sulfur is considered to be a means for improving air quality because of the negative impact the fuel sulfur has on the performance of automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbon and oxides of nitrogen and carbon monoxide. Such emissions are catalyzed by sunlight to form ground level ozone, more commonly referred to as smog.

Most of the sulfur in gasoline comes from the thermally processed gasolines. Thermally processed gasolines such, as for example, thermally cracked gasoline, visbreaker gasoline, coker gasoline and catalytically cracked gasoline (hereinafter collectively called "cracked-gasoline") contains in part olefins, aromatics, and sulfur-containing compounds.

Since most gasolines, such as for example automobile gasolines, racing gasolines, aviation gasoline and boat gasolines contain a blend of at least in part cracked-gasoline, reduction of sulfur in cracked-gasoline will inherently serve to reduce the sulfur levels in such gasolines.

The public discussion about gasoline sulfur has not centered on whether or not sulfur levels should be reduced. A consensus has emerged that lower sulfur gasoline reduces automotive emissions and improves air quality. Thus the real debate has focused on the required level of reduction, the geographical areas in need of lower sulfur gasoline and the time frame for implementation.

As the concern over the impact of automotive air pollution continues, it is clear that further efforts to reduce the sulfur levels in automotive fuels will be required. While the current gasoline products contain about 330 part per million with continued efforts by the Environmental Protection Agency to secure reduced levels, it has been estimated that gasoline will have to have less than 50 part per million of sulfur by the year 2010. (See Rock, K. L., Putman H. M., Improvements in FCC Gasoline Desulfurization via Catalytic Distillation" presented at the 1998 National Petroleum Refiners Association Annual Meeting (AM-98-37)).

In view of the ever increasing need to be able to produce a low sulfur content automotive fuel, a variety of processes have been proposed for achieving industry compliance with the Federal mandates.

One such process which has been proposed for the removal of sulfur from gasoline is called hydrodesulfurization. While hydrodesulfurization of gasoline can remove sulfur-containing compounds, it can result in the saturation of most, if not all, of the olefins contained in the gasoline. This saturation of olefins greatly affects the octane number (both the research and motor octane number) by lowering it. These olefins are saturated due to, in part, the hydrodesulfurization conditions required to remove thiophenic compounds (such as, for example, thiophene, benzothiophene, alkyl thiophenes, alkylbenzothiphenes and alkyl dibenzothiophenes), which are some of the most difficult sulfur-containing compounds to removed. Additionally, the hydrodesulfurization conditions required to remove thiophenic compounds can also saturate aromatics.

In addition to the need for removal of sulfur from cracked-gasolines, there is also presented to the petroleum industry a need to reduce the sulfur content of diesel fuels. In removing sulfur from diesel by hydrodesulfurization, the cetane is improved but there is a large cost in hydrogen consumption. This hydrogen is consumed by both hydrodesulfurization and aromatic hydrogenation reactions.

Thus there is a need for a process wherein desulfurization without hydrogenation of aromatics is achieved so as to provide a more economical process for the treatment of diesel fuels.

As a result of the lack of success in providing successful and economically feasible process for the reduction of sulfur levels in both cracked-gasolines and diesel fuels, it is apparent that there is still needed a better process for the desulfurization of both cracked-gasolines and diesel fuels which has minimal affect of octane while achieving high levels of sulfur removal.

It is thus an object of the present invention to provide a novel sorbent system for the removal of sulfur from fluid streams of cracked-gasolines and diesel fuels.

Another object of this invention is to provide a process for the production of novel sorbents which are useful in the desulfurization of such fluid streams.

Another object of this invention is to provide a process for the removal of sulfur-containing compounds from cracked-gasolines and diesel fuels which minimize saturation of olefins and aromatics therein.

A still further object of this invention is to provide a desulfurized cracked-gasoline that contains less than about 100 parts per million of sulfur based on the weight of the desulfurized cracked-gasoline and which contains essentially the same amount of olefins and aromatics as were in the cracked-gasoline from which it is made.

Other aspects, objects and the several advantages of this invention will be apparent from the following description of the invention and the appended claims.

SUMMARY OF THE INVENTION

The present invention is based upon our discovery that through the utilization of nickel in a substantially reduced valence state, preferably zero, in a sorbent composition there is achieved a novel sorbent composition which permits the ready removal of sulfur from streams of cracked-gasolines or diesel fuels with a minimal effect on the octane rating of the treated stream.

Accordingly, in one aspect of the present invention there is provided a novel sorbent suitable for the desulfurization of cracked-gasolines or diesel fuels which is comprised of zinc oxide, silica, alumina and nickel wherein the valence of the nickel is substantially reduced and such reduced valence nickel is present in an amount to permit the removal of sulfur from cracked-gasolines or diesel fuels.

In accordance with another aspect of the present invention, there is provided a process for the preparation of a novel sorbent composition which comprises admixing zinc oxide, silica and alumina so as to form a wet mix, dough, paste or slurry thereof, particulating the wet mix, dough, paste or slurry thereof so as to form a particulate granule, extrudate, tablet, sphere, pellet or microsphere thereof; drying the resulting particulate; calcining the dried particulate; impregnating the resulting solid particulate with a nickel or a nickel-containing compound; drying the resulting impregnated solid particulate composition, calcining the dried particulate composition and reducing the calcined product with a suitable reducing agent, such as hydrogen, so as to produce a sorbent composition having a substantial zero valence nickel content in an amount which is sufficient to permit the removal with same of sulfur from a cracked-gasoline or diesel fuel stream.

In accordance with a further aspect of the present invention, there is provided a process for the desulfurization of a cracked-gasoline or diesel fuel stream which comprises desulfurizing in a desulfurization zone a cracked-gasoline or diesel fuel with a solid-reduced nickel metal-containing sorbent, separating the desulfurized cracked-gasoline or diesel fuel from the sulfurized sorbent, regenerating at least a portion of the sulfurized-solid-reduced nickel metal metal-containing sorbent to produce a regenerated desulfurized solid nickel metal metal-containing sorbent; activating at least a portion of the regenerated desulfurized solid nickel metal-containing sorbent to produce a solid reduced nickel metal metal-containing sorbent; and thereafter returning at least a portion of the resulting reduced nickel metal-containing sorbent to the desulfurization zone.

DETAILED DESCRIPTION OF THE INVENTION

The term "gasoline" as employed herein is intended to mean a mixture of hydrocarbons boiling from about 100° F. to approximately 400° F. or any fraction thereof. Such hydrocarbons will include, for example, hydrocarbon streams in refineries such as naphtha, straight-run naphtha, coker naphtha, catalytic gasoline, visbreaker naphtha, alkylate, isomerate or reformate.

The term "cracked-gasoline" as employed herein is intended to mean hydrocarbons boiling from about 100° F. to approximately 400° F. or any fraction thereof that are products from either thermal or catalytic processes that crack larger hydrocarbon molecules into smaller molecules. Examples of thermal processes include coking, thermal cracking and visbreaking. Fluid catalytic cracking and heavy oil cracking are examples of catalytic cracking. In some instances the cracked-gasoline may be fractionated and/or hydrotreated prior to desulfurization when used as a feed in the practice of this invention.

The term "diesel fuel" as employed herein is intended to mean a fluid composed of a mixture of hydrocarbons boiling from about 300° F. to approximately 750° F. or any fraction thereof. Such hydrocarbon streams include light cycle oil, kerosene, jet fuel, straight-run diesel and hydrotreated diesel.

The term "sulfur" as employed herein is intended to mean those organosulfur compounds such as mercaptans or those thiophenic compounds normally present in cracked gasolines which include among others thiophene, benzothiophene, alkyl thiophenes, alkyl benzothiophenes and alkyldibenzothiophenes as well as the heavier molecular weights of same which are normally present in a diesel fuel of the types contemplated for processing in accordance with the present invention.

The term "gaseous" as employed herein is intended to mean that state in which the feed cracked-gasoline or diesel fuel is primarily in a vapor phase.

The term "substantially reduced nickel valence" as employed herein is intended to mean that a large portion of the valence of the nickel component of the composition is reduced to a value of less than 2, preferably zero.

The present invention is based upon the discovery of applicants that a substantially reduced valence nickel component in a particulate composition comprising zinc oxide, silica, alumina and nickel results in a sorbent which permits the removal of thiophenic sulfur compounds from fluid streams of cracked-gasolines or diesel fuels without having a significant adverse affect of the olefin content of such streams, thus avoiding a significant reduction of octane values of the treated stream. Moreover, the use of such novel sorbents results in a significant reduction of the sulfur content of the resulting treated fluid stream.

In a presently preferred embodiment of this invention, the sorbent composition has a nickel content in the range of from about 5 to about 50 weight percent.

The zinc oxide used in the preparation of the sorbent composition can either be in the form of zinc oxide, or in the form of one or more zinc compounds that are convertible to zinc oxide under the conditions of preparation described herein. Examples of such zinc compounds include, but are not limited to, zinc sulfide, zinc sulfate, zinc hydroxide, zinc carbonate, zinc acetate, and zinc nitrate. Preferably, the zinc oxide is in the form of powdered zinc oxide.

The silica used in the preparation of the sorbent compositions may be either in the form of silica or in the form of one or more silicon-containing compounds. Any suitable type of silica may be employed in the sorbent compositions of the present invention. Examples of suitable types of silica include diatomite, silicalite, silica colloid, flame-hydrolyzed silica, hydrolyzed silica, silica gel and precipitated silica, with diatomite being presently preferred. In addition, silicon compounds that are convertible to silica such as silicic acid, sodium silicate and ammonium silicate can also be employed. Preferably, the silica is in the form of diatomite.

The starting alumina component of the composition can be any suitable commercially available alumina material including colloidal alumina solutions and, generally, those alumina compounds produced by the dehydration of alumina hydrates.

The zinc oxide will generally be present in the sorbent composition in an amount in the range of from about 10 weight percent to about 90 weight percent, and preferably in an amount in the range of from about 15 to about 60 weight percent when such weight percents are expressed in terms of the zinc oxide based upon the total weight of the sorbent composition.

The silica will generally be present in the sorbent composition in an amount in the range of from about 5 weight percent to about 85 weight percent, preferably in an amount in the range of from about 20 weight percent to about 60 weight percent when the weight percents are expressed in terms of the silica based upon the total weight of the sorbent composition.

The alumina will generally be present in the sorbent composition in an amount in the range of from about 5.0 weight percent to about 30 weight percent, preferably from about 5.0 weight percent to about 15 weight percent when such weight percents are expressed in terms of the weight of the alumina compared with the total weight of the sorbent system.

In the manufacture of the sorbent composition, the primary components of zinc oxide, silica and alumina are combined together in appropriate proportions by any suitable manner which provides for the intimate mixing of the components to provide a substantially homogeneous mixture.

Any suitable means for mixing the sorbent components can be used to achieve the desired dispersion of the materials. Such means include, among others, tumblers, stationary shells or troughs, Muller mixers, which are of the batch or continuous type, impact mixers and the like. It is presently preferred to use a Muller mixer in the mixing of the silica, alumina and zinc oxide components.

Once the sorbent components are properly mixed to provide a shapeable mixture, the resulting mixture can be in the form of wet mix, dough, paste or slurry. If the resulting mix is in the form of a wet mix, the wet mix can be densified and thereafter particulated through the granulation of the densified mix following the drying and calcination of same. When the admixture of zinc oxide, silica and alumina results in a form of the mixture which is either in a dough state or paste state, the mix can be shaped to form a particulate granule, extrudate, tablet, sphere, pellet or mixrosphere. Presently preferred are cylindrical exrudates having from $\frac{1}{32}$ inch to $\frac{1}{2}$ inch diameter and any suitable length. The resulting particulate is then dried and then calcined. When the mix is in the form of a slurry, the particulation of same is achieved by spray drying the slurry to form micro-spheres thereof having a size of from about 20 to about 500 microns. Such microspheres are then subjected to drying and calcination. Following the drying and calcination of the particulated mixture, the resulting particulates can be impregnated with nickel oxide compound or a nickel oxide precursor.

Following the impregnation of the particulate compositions with the appropriate nickel compound, the resulting impregnated particulate is then subjected to drying and calcination prior to the subjecting of the calcined particulate to reduction with a reducing agent, preferably hydrogen.

The elemental nickel, nickel oxide or nickel-containing compound can be added to the particulated mixture by impregnation of the mixture with a solution, either aqueous or organic, that contains the elemental nickel, nickel oxide or nickel-containing compound. In general, the impregnation with the nickel is carried out so as to form a resulting particulate composition of zinc oxide, silica, alumina and the nickel metal, nickel oxide or nickel oxide precursor prior to the drying and calcination of the resulting impregnated composition.

The impregnation solution is any aqueous solution and amounts of such solution which suitably provides for the impregnation of the mixture of zinc oxide, silica and alumina to give an amount of nickel oxide in the final zinc oxide based composition to provide when reduced a reduced nickel metal content sufficient to permit the removal of sulfur from streams of cracked-gasoline or diesel fuels when so treated with same in accordance with the process of the present invention.

Once the nickel, nickel oxide or nickel oxide precursor has been incorporated into the particulate calcined zinc oxide, alumina and silica mixture, the desired reduced valence nickel metal sorbent is prepared by drying the resulting composition followed by calcination and thereafter subjecting the resulting calcined composition to reduction with a suitable reducing agent, preferably hydrogen, so as to produce a composition having a substantial zero valence nickel content therein with such zero valence nickel content being present in an amount to permit the removal with same of sulfur from a cracked-gasoline or diesel fuel fluid stream.

The solid reduced nickel metal sorbent of this invention is a composition that has the ability to react with and/or chemisorb with organo-sulfur compounds, such as thiophenic compounds. It is also preferable that the sorbent removes diolefins and other gum forming compounds from the cracked-gasoline.

The solid reduced metal sorbent of this invention is comprised of nickel that is in a substantially reduced valence state, preferably a zero valence state. Presently the reduced metal is nickel. The amount of reduced nickel in the solid nickel reduced metal sorbents of this invention is that amount which will permit the removal of sulfur from a cracked-gasoline or diesel fuel fluid stream. Such amounts are generally in the range of from about 5 to about 50 weight percent of the total weight of nickel in the sorbent composition. Presently it is preferred that the reduced nickel metal be present in an amount in the range of from about 15 to about 40 weight percent of the total weight of nickel in the sorbent composition.

In one presently preferred embodiment of the present invention, the reduced nickel is present in an amount in the range of from about 15 to 30 weight percent and the nickel component has been substantially reduced to zero valence.

In another presently preferred embodiment of this invention, zinc oxide is present in an amount of about 38 weight percent, silica is present in an amount of about 31 weight percent, alumina is present in an amount of about 8 weight percent and nickel is present prior to reduction to zero valence in an amount of about 30 weight percent nickel oxide.

In another presently preferred embodiment of this invention, zinc oxide is present in an amount of about 41 weight percent, silica is present in an amount of about 32 weight percent, alumina is present in an amount of about 8 weight percent and nickel is present prior to reduction in an amount of about 19 weight percent.

From the above, it can be appreciated that the sorbent compositions which are useful in the desulfurization process of this invention can be prepared by a process which comprises:

(a) admixing zinc oxide, silica and alumina so as to form a mix of same in the form of one of a wet mix, dough, paste or slurry;

(b) particulating the resulting mix to form particulates thereof in the form of one of granules, extrudates, tablets, pellets, spheres or microspheres;

(c) drying the resulting particulate;

(d) calcining the dried particulate;

(e) impregnating the resulting calcined particulate with nickel, nickel oxide or a precursor for nickel;

(f) drying the impregnated particulate;

(g) calcining the resulting dried particulate; and (h) reducing the calcined particulate product of (g) with a suitable reducing agent so as to produce a particulate composition having a substantial reduced valence nickel content therein and wherein the reduced valence nickel content is present in an amount sufficient to permit the removal with same of sulfur from a cracked-gasoline or diesel fuel fluid stream when contacted with the resulting substantially reduced valence nickel particulated sorbent.

The process to use the novel sorbents to desulfurize cracked-gasoline or diesel fuels to provide a desulfurized cracked-gasoline or diesel fuel comprises:

(a) desulfurizing in a desulfurization zone a cracked-gasoline or diesel fuel with a solid reduced nickel metal metal-containing sorbent;

(b) separating the desulfurized cracked-gasoline or desulfurized diesel fuel from the resulting sulfurized solid reduced nickel-containing sorbent;

(c) regenerating at least a portion of the sulfurized solid reduced nickel-containing sorbent to produce a regenerated desulfurized solid nickel-containing sorbent;

(d) reducing at least a portion of the regenerated desulfurized solid nickel-containing sorbent to produce a solid reduced nickel-containing sorbent thereafter and;

(e) returning at least a portion of the regenerated solid reduced nickel-containing sorbent to the desulfurization zone.

The desulfurization step (a) of the present invention is carried out under a set of conditions that includes total pressure, temperature, weight hourly space velocity and hydrogen flow. These conditions are such that the solid reduced nickel-containing sorbent can desulfurize the cracked-gasoline or diesel fuel to produce a desulfurized cracked-gasoline or desulfurized diesel fuel and a sulfurized sorbent.

In carrying out the desulfurization step of the process of the present invention, it is preferred that the feed cracked-gasoline or diesel fuel be in a vapor phase. However, in the practice of the invention it is not essential, albeit preferred, that the feed be totally in a vapor or gaseous state.

The total pressure can be in the range of about 15 psia to about 1500 psia. However, it is presently preferred that the total pressure be in a range of from about 50 psia to about 500 psia.

In general, the temperature should be sufficient to keep the cracked-gasoline or diesel fuel essentially in a vapor phase. While such temperatures can be in the range of from about 100° F. to about 1000° F., it is presently preferred that the temperature be in the range of from about 400° F. to about 800° F. when treating as cracked-gasoline and in the range of from about 500° F. to about 900° F. when the feed is a diesel fuel.

Weight hourly space velocity (WHSV) is defined as the pounds of hydrocarbon feed per pound of sorbent in the desulfurization zone per hour. In the practice of the present invention, such WHSV should be in the range of from about 0.5 to about 50, preferably about 1 to about 20 hr$^{-1}$.

In carrying out the desulfurization step, it is presently preferred that an agent be employed which interferes with any possible chemisorbing or reacting of the olefinic and aromatic compounds in the fluids which are being treated with the solid reduced nickel-containing sorbent. Such an agent is presently preferred to be hydrogen.

Hydrogen flow in the desulfurization zone is generally such that the mole ratio of hydrogen to hydrocarbon feed is the range of about 0.1 to about 10, and preferably in the range of about 0.2 to about 3.0.

The desulfurization zone can be any zone wherein desulfurization of the feed cracked-gasoline or diesel fuel can take place. Examples of suitable zones are fixed bed reactors, moving bed reactors, fluidized bed reactors and transport reactors. Presently, a fluidized bed reactor or a fixed bed reactor is preferred.

If desired, during the desulfurization of the vaporized fluids, diluents such as methane, carbon dioxide, flue gas, and nitrogen can be used. Thus it is not essential to the practice of the process of the present invention that a high purity hydrogen be employed in achieving the desired desulfurization of the cracked-gasoline or diesel fuel.

It is presently preferred when utilizing a fluidized system that a solid reduced nickel sorbent be used that has a particle size in the range of about 20 to about 1000 micrometers. Preferably, such sorbents should have a particle size of from about 40 to about 500 micrometers. When a fixed bed system is employed for the practice of the desulfurization process of this invention, the sorbent should be such as to have a particle size in the range of about $\frac{1}{32}$ inch to about $\frac{1}{2}$ inch diameter.

It is further presently preferred to use solid reduced nickel sorbents that have a surface area of from about 1 square meter per gram to about 1000 square meters per gram of solid sorbent.

The separation of the gaseous or vaporized desulfurized fluids and sulfurized sorbent can be accomplished by any means known in the art that can separate a solid from a gas. Examples of such means are cyclonic devices, settling chambers or other impingement devices for separating solids and gases. The desulfurized gaseous cracked-gasoline or desulfurized diesel fuel can then be recovered and preferably liquefied.

The gaseous cracked-gasoline or gaseous diesel fuel is a composition that contains in part, olefins, aromatics and sulfur-containing compounds as well as paraffins and naphthenes.

The amount of olefins in gaseous cracked-gasoline is generally in the range of from about 10 to 35 weight percent based on the weight of the gaseous cracked-gasoline. For diesel fuel there is essentially no olefin content.

The amount of aromatics in gaseous cracked-gasoline is generally in the range of about 20 to about 40 weight percent based on the weight of the gaseous cracked gasoline. The amount of aromatics in gaseous diesel fuel is generally in the range of about 10 to about 90 weight percent.

The amount of sulfur in cracked-gasolines or diesel fuels can range from about 100 parts per million sulfur by weight of the gaseous cracked-gasoline to about 10,000 parts per million sulfur by weight of the gaseous cracked-gasoline and from about 100 parts per million to about 50,000 parts per million for diesel fuel prior to the treatment of such fluids with the sorbent system of the present invention.

The amount of sulfur in cracked-gasolines or in diesel fuels following treatment of same in accordance with the desulfurization process of this invention is less than 100 parts per million.

In carrying out the process of this invention, if desired, a stripper unit can be inserted before the regenerator for regeneration of the sulfurized sorbent which will serve to remove a portion, preferably all, of any hydrocarbons from the sulfurized sorbent or before the hydrogen reduction zone so as to remove oxygen and sulfur dioxide from the system prior to introduction of the regenerated sorbent into the sorbent activation zone. The stripping comprises a set of conditions that includes total pressure, temperature and stripping agent partial pressure.

Preferably the total pressure in a stripper, when employed, is in a range of from about 25 psia to about 500 psia.

The temperature for such strippers can be in the range of from about 100° F. to about 1000° F.

The stripping agent is a composition that helps to remove hydrocarbons from the sulfurized solid sorbent. Presently, the preferred stripping agent is nitrogen.

The sorbent regeneration zone employs a set of conditions such that at least a portion of the sulfurized sorbent is desulfurized.

The total pressure in the regeneration zone is generally in the range of from about 10 to about 1500 psia. Presently preferred is a total pressure in the range of from about 25 psia to about 500 psia.

The sulfur removing agent partial pressure is generally in the range of from about 1 percent to about 25 percent of the total pressure.

The sulfur removing agent is a composition that helps to generate gaseous sulfur oxygen-containing compounds such a sulfur dioxide, as well as to burn off any remaining hydrocarbon deposits that might be present. Currently, oxygen-containing gases such as air are the preferred sulfur removing agent.

The temperature in the regeneration zone is generally from about 100° F. to about 1500° F. with a temperature in the range of about 800° F. to about 1200° F. being presently preferred.

The regeneration zone can be any vessel wherein the desulfurizing or regeneration of the sulfurized sorbent can take place.

The desulfurized sorbent is then reduced in an activation zone with a reducing agent so that at least a portion of the nickel content of the sorbent composition is reduced to produce a solid nickel reduced metal sorbent having an amount of reduced metal therein to permit the removal of sulfur components from a stream of cracked-gasoline or diesel fuel.

In general, when practicing the process of this invention, the reduction of the desulfurized solid nickel-containing sorbent is carried out at a temperature in the range of about 100° F. to about 1500° F. and a pressure in the range of about 15 to 1500 psia. Such reduction is carried out for a time sufficient to achieve the desired level of nickel reduction in the sorbent system. Such reduction can generally be achieved in a period of from about 0.01 to about 20 hours.

Following the activation of the regenerated particulate sorbent, at least a portion of the resulting activated (reduced) sorbent can be returned to the desulfurization unit.

When carrying out the process of the present invention in a fixed bed system, the steps of desulfurization, regeneration, stripping, and activation are accomplished in a single zone or vessel.

The desulfurized cracked-gasoline resulting from the practice of the present invention can be used in the formulation of gasoline blends to provide gasoline products suitable for commercial consumption.

The desulfurized diesel fuels resulting from the practice of the present invention can likewise be used for commercial consumption where a low sulfur-containing fuel is desired.

EXAMPLES

The following examples are intended to be illustrative of the present invention and to teach one of ordinary skill in the art to make and use the invention. These examples are not intended to limit the invention in any way.

Example I

A solid reduced nickel metal sorbent was produced by dry mixing 20.02 pounds of diatomite silica and 25.03 pounds of zinc oxide in a mix-Muller for 15 minutes to produce a first mixture. While still mixing, a solution containing 6.38 pounds of Disperal alumina (Condea), 22.5 pounds of deionized water and 316 grams of glacial acetic acid, were added to the mix-Muller to produce a second mixture. After adding these components, mixing continued for an additional 30 minutes. This second mixture was then dried at 300° F. for 1 hour and then calcined at 1175° F. for 1 hour to form a third mixture. This third mixture was then particulated by granulation using a Stokes Pennwalt Granulator fitted with a 50 mesh screen. The resulting granulated mixture was then impregnated with 673.8 grams of nickel nitrate hexahydrate dissolved in 20 grams of hot (200° F.) deionized water per 454 grams of granulated third mixture to produce an impregnated particulate. The impregnated mixture was dried at 300° F. for one hour and then calcined at 1175 ° F. for one hour to form a solid particulate nickel oxide-containing composition.

The solid nickel oxide-containing particulate was then reduced by subjecting it to a temperature of 1000° F., a total pressure of 15 psia and a hydrogen partial pressure of 15 psi for 30 minutes to produce a solid reduced nickel sorbent wherein the nickel component of the sorbent composition was reduced substantially to zero valence.

Reduction of the particulate solid calcined composition comprising zinc oxide, silica, alumina and a nickel compound so as to obtain the desired sorbent having a reduced valence nickel content is carried out in the reactor as described in Example II. Alternatively, such reduction or activation of the particulate composition to form the desired sorbent can be carried out in a separate activation or hydrogenation zone and subsequently transferred to the unit in which desulfurization of the feedstock is to be carried out.

Example II

The particulate solid reduced nickel sorbent as prepared in Example I was tested for its desulfurization ability as follows.

A 1-inch quartz reactor tube was loaded with the indicated amounts as noted below of the sorbent of Example I. This solid nickel sorbent was placed on a frit in the middle of the reactor and subjected to reduction with hydrogen as noted in Example I. Gaseous cracked-gasoline having about 310 parts per million sulfur by weight sulfur-containing compounds based on the weight of the gaseous cracked-gasoline and having about 95 weight percent thiophenic compounds (such as for example, alkyl benzothiophenes, alkyl thiophenes, benzothiophene and thiophene) based on the weight of sulfur-containing compounds is the gaseous cracked-gasoline was pumped upwardly through the reactor. The rate was 13.4 milliliters per hour. This produced sulfurized solid sorbent and desulfurized gaseous-cracked gasoline. In Run 1, no hydrogen was used during the desulfurization resulting in no reduction in its sulfur content.

After Run 1, the sulfurized sorbent was subjected to desulfurizing conditions that included a temperature of 900° F., a total pressure of 15 psia and an oxygen partial pressure of 0.6 to 3.1 psi for a time period of 1–2 hours. Such conditions are hereinafter referred to as "regeneration conditions" to produce a desulfurized nickel-containing sorbent. This sorbent was then subjected to reducing conditions that included a temperature of 700° F., a total pressure of 15 psia and a hydrogen partial pressure of 15 psi for a time period of 0.5 hours. Such conditions are hereinafter referred to as "reducing conditions".

The resulting solid reduced nickel metal sorbent composition was then used in Run 2. In this run, hydrogen was added to the cracked-gasoline feed at a partial pressure of 2.25 psi which resulted in the reduction of sulfur content from 310 ppm to 30 ppm after 1 hour and 170 ppm after 4 hours.

After Run 2, the sulfurized sorbent was then subjected to the desulfurizing conditions and the reducing conditions. This solid sorbent was then used in Run 3. Run 3 was a repeat of Run 2 indicating the sorbent can be regenerated.

After Run 3, the sulfurized sorbent was subjected to the regeneration conditions. This regenerated sorbent was then used in Run 4. In Run 4, the sorbent was not reduced prior to the desulfurization run, resulting in a poorer removal of sulfur from the feed.

After Run 4, the sulfurized sorbent was subjected to the desulfurizing conditions and the reducing conditions. This solid nickel reduced metal sorbent was then used in Run 5. In Run 5, when the hydrogen partial pressure was increased to 13.2 psi, the performance of the sorbent markedly improved and a sulfur removal to 5–30 ppm was observed.

After Run 5, the sulfurized sorbent was subjected to the regeneration conditions and the reducing conditions. This solid reduced nickel metal sorbent was then used in Run 6. In Run 6, the temperature was raised to 700° F. which improved the sulfur reduction ability of the sorbent resulting in a product that contained 10 ppm or less sulfur.

After Run 6, the sulfurized sorbent was subjected to the regeneration conditions and the reducing conditions. This solid reduced nickel metal sorbent was then used in Run 7 with the temperature returned to 600° F. Once again the sorbent showed ability to remove sulfur but not as efficient as at 700° F.

After Run 7, the sulfurized sorbent was subjected to the regeneration conditions and the reducing conditions. This solid reduced nickel metal sorbent was then added to 5 grams of new solid reduced nickel metal sorbent and then used in Run 8. The reactor had a total of 10 grams of sorbent instead of 5 grams in Runs 1–7. Under these conditions, the sulfur was reduced to less than 5 ppm from gasoline.

Runs 8 and 9 show the high effectiveness of the invention sorbent to reduce sulfur from cracked-gasoline to less than or equivalent to 5 ppm at two differential pressures of hydrogen and that the sorbent is regenerable.

The feed employed in these runs had a Motor Octane Number (MON) of 80 and an olefin content of 24.9 weight percent. The composite MON for Run 8 was 79.6. The composite MON for Run 9 was 79.9. When compared with the MON value of the feed it can be seen that no significant loss of octane was observed. The olefin content was reduced only 10 percent as shown by a comparison of the original feed olefin content of 24.9 weight percent with Run 8 product which had an olefin content of 22.4 weight percent and Run 9 product which also had an olefin content of 22.4 weight percent.

The results of this series of runs is set forth in Table 1.

TABLE 1

| Reactor Conditions | Run Number | | | | | | | | |
|---|---|---|---|---|---|---|---|---|---|
| | 1 | 2 | 3 | 4 | 5 | 6 | 7 | 8 | 9 |
| Amount (grams) | 5 | 5 | 5 | 5 | 5 | 5 | 5 | 10 | 10 |
| TP[1] | 15 | 15 | 15 | 15 | 15 | 15 | 15 | 15 | 15 |
| HPP[2] | 0 | 2.25 | 2.25 | 2.25 | 13.2 | 13.2 | 13.2 | 13.2 | 6.6 |
| ° F. | 600 | 600 | 600 | 600 | 600 | 700 | 600 | 600 | 600 |
| TOS[3] | Sulfur[4] | | | | | | | | |
| 1 | 310 | 30 | 15 | 195 | 5 | 5 | 25 | <5 | 5 |
| 2 | | 80 | 105 | 225 | 20 | 10 | 35 | 5 | 5 |
| 3 | | 120 | 175 | 220 | 30 | 10 | 20 | 5 | <5 |
| 4 | 345 | 170 | 215 | 235 | 30 | 10 | 15 | <5 | <5 |
| 5 | | | | | | | | <5 | <5 |
| 6 | | | | | | | | <5 | <5 |

[1]Total pressure in psia.
[2]Hydrogen partial pressure in psia.
[3]The time on stream in hours.
[4]The amount of sulfur-containing compounds left in the desulfurized cracked-gasoline in parts per million sulfur by weight based on the weight of the desulfurized cracked-gasoline.

Example III

A second solid reduced nickel metal sorbent composition was prepared as follows:

363 grams of diatomite silica was mixed with 443 grams of Nyacol Al-20 alumina solution in a mix-Muller. While still mixing, 454 grams of dry zinc oxide powder was then added to the above mixture and further mixed for 30 minutes to form an extrudable paste. This paste was extruded through a laboratory 1-inch Bonnot extruder employing a die containing 1/16 inch holes. The wet extrudate was dried at 300° F. for one hour and calcined at 1175° F. for one hour. 500 grams of dried extrudate were then impregnated with a solution of 371.4 grams of nickel nitrate hexahydrate dissolved in 36.5 ml of deionized water. The nickel impregnates were dried at 300° F. for one hour and then calcined at 1175° F. for one hour. 200 grams of the first nickel impregnated sorbent was subjected to a second impregnation with 74.3 grams of nickel nitrate hexahydrate dissolved in 30 grams of deionized water. After the second impregnation, once again the impregnated extrudates were dried at 300° F. for one hour and then calcined at 1175° F. for one hour.

The extruded solid nickel oxide sorbent was then reduced in the reactor by subjecting it to a temperature of 700° F., a total pressure of 15 psia and a hydrogen partial pressure of 15 psia for 60 minutes to produce an extruded solid reduced nickel sorbent wherein the nickel component of the sorbent composition was substantially reduced to zero valence state.

Example IV 10 grams of the particulate sorbent of Example III was placed in a ½ inch diameter stainless steel tube having a length of about 12 inches. The bottom of the tube was packed with alundum pellets (R-268 Norton Chemical) to provide an inert support for the bed of sorbent which was placed in the middle of the reactor. Alundum was also placed on top of the sorbent bed. Gaseous diesel motor fuel having a density at 37.5° C. of 0.8116 g/cc, an Initial Boiling Point of 266° F. and a Final Boiling Point of 725° F. and having 415 ppm sulfur by weight sulfur-containing compounds based on the weight of the gaseous diesel fuel was pumped downwardly through the reactor at a WHSV of 1.0 hr$^{-1}$.

The reactor was maintained at a temperature of 800° F. and a pressure of 150 psig. Hydrogen Flow was at 50 sccm feed (standard cubic centimeters per minute).

The sorbent composition was reduced with hydrogen for 1 hour before Run 1. Before Run 2, the sorbent was regenerated with air at 900° F. for 1 hour, then purged with nitrogen and then reduced in flowing hydrogen for 1 hour at 700° F.

The product sulfur (ppm) for each run was measured at 1 hour intervals over a 4 hour period.

The following results were obtained:

| Run | 1 Hour | 2 Hours | 3 Hours | 4 Hours |
| --- | --- | --- | --- | --- |
| 1 | 120 | 30 | 15 | 15 |
| 2 | 50 | 15 | 15 | 25 |

The above data clearly demonstrate that use of the reduced nickel sorbent of this invention to remove sulfur from a diesel fuel having 415 ppm results in a significant reduction of the sulfur content—generally to below 50 ppm.

The specific examples herein disclosed are to be considered as being primarily illustrative. Various changes beyond those described will no doubt occur to those skilled in the art; and such changes are to be understood as forming a part of this invention insofar as they fall within the spirit and scope of the appended claims.

That which is claimed is:

1. A sorbent composition suitable for removal of sulfur from cracked gasolines and diesel fuels which comprises:
   (a) zinc oxide;
   (b) silica;
   (c) alumina; and
   (d) nickel
   wherein said zinc oxide is present in an amount in the range of about 10 to about 90 weight percent;
   wherein said silica is present in an amount in the range of about 5 to about 85 weight percent;
   wherein said alumina is present in an amount in the range of from about 5 to about 30 weight percent; and
   wherein said nickel is present in a substantial reduced valence state and in an amount which effects the removal of organosulfur from a stream of cracked-gasolines or diesel fuel when contacted with same under desulfurization conditions.

2. A sorbent composition in accordance with claim 1 wherein said nickel is present in an amount in the range of about 5 to about 50 weight percent.

3. A sorbent composition in accordance with claim 1 wherein said zinc oxide is present in an amount in the range of about 15 to about 60 weight percent, said silica is present in an amount in the range of about 20 to about 60 weight percent, said alumina is present in an amount in the range of about 5.0 to about 15 weight percent and said nickel is present in an amount in the range of about 15 to about 40 weight percent.

4. A sorbent composition in accordance with claim 3 wherein said zinc oxide is present in an amount of about 38 weight percent, said silica is present in an amount of about 31 weight percent, said alumina is present in an amount of about 8 weight percent and said nickel is present prior to reduction in an amount of about 30 weight percent nickel oxide.

5. A sorbent composition in accordance with claim 3 wherein said zinc oxide is present in an amount of about 41 weight percent, said silica is present in an amount of about 32 weight percent, said alumina is present in an amount of about 8 weight percent and said nickel is present in an amount of about 19 weight percent.

6. A sorbent composition in accordance to claim 1 wherein said composition is a particulate in the form of one of granule, extrudate, tablet, sphere, pellet or microsphere.

7. A process for the production of a sorbent composition suitable for the removal of sulfur from a cracked-gasoline or diesel fuel stream which comprises:
   (a) admixing of zinc oxide, silica and alumina so as to form a mix thereof wherein said zinc oxide is present in an amount in the range of from about 10 to about 90 weight percent, said silica is present in an amount in the range of about 5 to about 85 weight percent and said alumina is present in an amount in the range of from about 5 to about 30 percent;
   (b) particulating the resulting mix so as to form particles thereof
   (c) drying the particulate of step (b);
   (d) calcining the dried particulate of step (c);
   (e) impregnating the resulting calcined particulate of step (d) with nickel or a nickel-containing compound;
   (f) drying the impregnated particulate of step (e);
   (g) calcining the dried particulate of step (f); and thereafter
   (h) reducing the resulting calcined particulate of step (g) in a reduction zone with reducing agent under suitable conditions to effect a substantial reduction of the valence of the nickel content so as to provide an amount of reduced valence nickel metal such that the resulting composition will effect the removal of organosulfur compounds from a cracked-gasoline or diesel fuel stream when said stream is contacted with same under desulfurization conditions.

8. A process in accordance with claim 7 wherein said mix is in the form of one of a wet mix, dough, paste or slurry.

9. A process in accordance with claim 7 wherein said particles are in the form of one of granules, extrudates, tablets, spheres, pellets or microspheres.

10. A process in accordance with claim 7 wherein said particulate is impregnated with nickel or a nickel compound in an amount to provide a nickel content therein in an amount in the range of from about 5 to about 50 weight percent.

11. A process in accordance with claim 7 wherein said particulate is dried in steps (c) and (f) at a temperature in the range of about 150° F. to about 350° F.

12. A process in accordance with claim 7 wherein said dried particulate is calcined in steps (d) and (g) at a temperature in the range of about 400° F. to about 1500° F.

13. A process in accordance with claim 8 wherein said zinc oxide is present in an amount in the range of about 15 to about 60 weight percent, said silica is present in an amount in the range of about 20 to about 60 weight percent, said alumina is present in an amount in the range of about 5.0 to about 15 weight percent and said nickel is present in an amount in the range of about 15 to about 40 weight percent.

14. A process in accordance with claim 7 wherein the reduction of nickel is carried out at a temperature in the range of about 100° F. to about 1500° F. and at a pressure in the range of about 15 to about 1500 psia for a time sufficient to permit the formation of the desired reduced valence nickel component.

15. The sorbent product of the process of claim 7.

16. The sorbent product of the process of claim 10.

17. The sorbent product of the process of claim 13.

18. A process for the removal of an organosulfur from a stream of a cracked-gasoline or a diesel fuel which comprises:

(a) contacting said stream with a sorbent composition comprising zinc oxide, silica, alumina and nickel wherein said nickel is present in a substantially reduced valence state and in amount which will effect the removal of an organosulfur compound from said stream in a desulfurization zone under conditions such that there is formed a desulfurized fluid stream of cracked-gasoline or diesel fuel and a sulfurized sorbent;

(b) separating the resulting desulfurized fluid stream from said sulfurized sorbent;

(c) regenerating at least a portion of the separated sulfurized sorbent in a regeneration zone so as to remove at least a portion of the sulfur absorbed thereon;

(d) reducing the resulting desulfurized sorbent in an activation zone so as to provide a reduced valence nickel content therein which will affect the removal of an organosulfur comopound from a stream of a cracked-gasoline or diesel fuel when contacted with same; and thereafter (e) returning at least a portion of the resulting desulfurized, reduced sorbent to said desulfurization zone.

19. A process in accordance to claim 18 wherein said desulfurization is carried out at a temperature in the range of about 100° F. to about 1000° F. and a pressure in the range of about 15 to about 1500 psia for a time sufficient to affect the removal of organosulfur from said stream.

20. A process in accordance to claim 18 wherein said regeneration is carried out at a temperature in the range of about 100° F. to about 1500° F. and a pressure in the range of about 10 to about 1500 psia for a time sufficient to effect the removal of at least a portion of sulfur from the sulfurized sorbent.

21. A process in accordance with claim 20 wherein there is employed air as a regeneration agent in said regeneration zone.

22. A process in accordance with claim 18 wherein said regenerated sorbent is subjected to reduction with hydrogen in a hydrogenation zone which is maintained at a temperature in the range of about 100° F. to about 1500° F. and at a pressure in the range of about 15 to about 1500 psia and for a period of time to affect a substantial reduction of the valence of the nickel content of said sorbent.

23. A process in accordance with claim 18 wherein said separated sulfurized sorbent is stripped prior to introduction to said regeneration zone.

24. A process in accordance with claim 18 wherein the regenerated sorbent is stripped prior to introduction into said activation zone.

25. A sorbent composition suitable for removal of sulfur from cracked gasolines and diesel fuels which comprises:

(a) zinc oxide;

(b) silica;

(c) alumina; and (d) nickel wherein said zinc oxide is present in an amount in the range of about 10 to about 90 weight percent;

wherein said silica is present in an amount in the range of about 5 to about 85 weight percent;

wherein said alumina is present in an amount in the range of from about 5 to about 30 weight percent;

wherein said nickel is present in a substantial reduced valence state and in an amount which effects the removal of organosulfur from a stream of cracked-gasolines or diesel fuel when contacted with same under desulfurization conditions; and wherein at least a portion of the composition is calcined to convert at least a portion of the alumina to an aluminate.

* * * * *